United States Patent Office 2,818,347
Patented Dec. 31, 1957

2,818,347
METHOD FOR MAKING COMPOSITE TITANIUM DIOXIDE RUTILE PIGMENT

Roland W. Brickenkamp, St. Louis, Mo., and Charles L. Schmidt, Fair Haven, N. J., assignors to National Lead Company, New York, N. Y., a corporation of New Jersey No Drawing. Application September 25, 1953
Serial No. 382,462

8 Claims. (Cl. 106—300)

The present invention relates in general to the treatment of titanium bearing materials to form hydrated or dehydrated titanium oxides, and in particular to a process for preparing a composite titanium dioxide hydrate which may be calcined directly to pigment material having the structure of rutile.

Processes for the manufacture of titanium dioxide pigments for commercial use at the present time depend almost exclusively upon the reaction of titaniferous bearing materials, and in particular ilmenite, with sulfuric acid. Ilmenite is a mineral which, in general, may be referred to as an iron titanate ($FeTiO_3$) and is composed principally of titanium oxide and iron fractions in the form of ferric oxide and ferrous oxide.

In general, in the treatment of ilmenite with concentrated sulfuric acid, the admixture is heated until a reaction between the ilmenite and acid sets in. The digestion cake which results from this reaction is then dissolved in water and the ferric iron values reduced to ferrous iron by adding metallic iron to the solution. Thereafter the solution is clarified and a so-called extender, such as, for example, calcium sulfate, is added and the mixture boiled (hydrolyzed) until substantially all of the titanium is precipitated out as a composite hydrolysate having the form of an anatase titanium dioxide modification which is subsequently filtered, washed and calcined to produce a composite pigment material.

Modifications of this procedure include the addition of an extender in the form of an aqueous slurry to a precipitated titanium dioxide hydrate; or mixing the aqueous extender into a titanium sulfate solution prior to hydrolysis.

However, in these and in all previously known methods of preparing composite titanium dioxide pigment material from the hydrolysate of an ilmenite ore sulfate solution, the calcined hydrolysate has remained substantially in the form of anatase, and hence it has been necessary to treat the hydrolysate, before calcination, with a suitable promoter so as to cause the anatase modification to convert to the rutile modification whereby the calcined pigment will possess the characteristic whiteness of color, fine particle size, soft texture, improved tinting strength, and other well-known characteristics of rutile.

An object of the present invention is to provide an improved method of producing a composite titanium dioxide pigment of rutile structure.

A further object of the invention is to provide a method for precipitating a titanium hydrate upon an extender to form a composite titanium dioxide hydrate which, when calcined within a temperature range suitable for optimum pigmentary particle size and without the addition of a promoter, will form a composite rutile pigment.

A further object of the invention is to provide a sulfate solution prepared from a hydrochloric acid leached ore residue for use in the preparation of composite pigments from which may be precipitated an anatase titanium dioxide modification which is easily convertible to the rutile structure by calcination.

A still further object of the invention is to provide an improved method for forming an anatase titanium dioxide modification easily convertible to rutile without the use of a promoter wherein a hydrochloric acid leached ore residue is used in preparing the sulfate solution from which the hydrate is precipitated.

These and other objects, features and advantages of the invention will become more apparent from the following more complete description and the appended claims.

In its broadest aspects the present invention relates to the discovery of an improved method for making a composite pigment of rutile structure by mixing an extender with a titanium sulfate solution prepared by the use of a hydrochloric acid leached ore residue, precipitating a composite hydrate from the solution and thereafter calcining the washed and dried composite hydrate directly to form a composite titanium dioxide pigment of rutile structure.

Although a sulfate solution may be prepared from the digest of a hydrochloric acid leached residue alone, it is within the purview of the invention to form a sulfate solution from the digest of a mixture of a titaniferous material as, for example, a titaniferous ore, ore concentrate or titaniferous slag, and a hydrochloric acid leached ore residue; or by the admixture of separate sulfate solutions formed from a titaniferous material and a hydrochloric acid leached ore residue respectively.

As used hereinafter and in the following claims, the term "leached ore sulfate solution" shall be understood to mean a titanium sulfate solution which has been prepared by the use of a hydrochloric acid leached ore residue alone or prepared by admixtures of the latter with ores or slags in the manners suggested above.

The term "composite," as used in conjunction with the hydrate and calcined pigment, shall be understood to connote the use, at hydrolysis, of an extender, such as, for example, barium or calcium sulfate, upon which the titanium dioxide hydrate is deposited as a coalesced precipitate. Although calcium sulfate anhydrite, barium sulfate or strontium sulfate may be used as extenders, it has been found that calcium sulfate anhydrite is highly satisfactory from a commercial standpoint, and hence the extender referred to in describing and illustrating the present invention will be a calcium sulfate anhydrite, the composite pigment formed from the coprecipitated hydrate being sometimes termed a calcium base pigment.

The hydrochloric acid leached ore residue referred to herein is a fine titanium dioxide rutile modification, comprising substantially 100% $TiO_2$, precipitated from a titanium-iron-chloride solution obtained by leaching a titaniferous ore with hydrochloric acid at elevated temperatures to remove the bulk of the iron. Specifically, a titaniferous ore ground to a particle size of about 0.5 to 2.0% plus 200 mesh is mixed with concentrated (20° Bé.) hydrochloric acid in the ratio of about 1 part ore to 2.25 parts HCl (20° Bé.) and heated to a temperature of about 105° C. whereupon a substantial portion of the iron values go into solution, and the titanium values are precipitated out as a fine titanium dioxide residue of the rutile modification, the particle size of the acid leached ore residue falling within the range of from 0.9% plus 200 to 9.3% plus 325 mesh.

SULFATE SOLUTION FROM HYDROCHLORIC ACID LEACHED ORE RESIDUE

The titanium sulfate solution may be prepared from an acid leached ore residue alone by digesting the latter in concentrated sulfuric acid. Specifically, the digestion treatment comprises mixing the acid leached ore residue with concentrated (96%) sulfuric acid in an amount such that the ratio of acid, calculated as 100% $H_2SO_4$, to acid leached ore residue is within the range of 1.7 to 1.8 parts acid to 1 part acid leached ore residue, heating the mixture for from ¼ to ½ hour at a temperature of from 80 to 120° C. and thereafter adjusting the acid concentration for reaction to from about 86% to 88% and continuing the reaction until a digestion cake sets up. The digestion cake is then cut with water and the solution filtered to form a clarified leached ore sulfate solution having a titanium dioxide concentration of from 180 to 210 grams per liter.

As pointed out above, the hydrolysis of a sulfate solution for precipitating a composite hydrate is accomplished by introducing into the sulfate solution, prior to hydrolysis, an extender, such as, for example, a slurry of calcium sulfate anhydrite ($CaSO_4$) prepared as described in U. S. Patent No. 1,906,730, Washburn, May 2, 1933, and the U. S. patents referred to therein. Although a calcium sulfate slurry may be used to advantage as an extender in the manufacture of a composite titanium pigment, it will be understood that other extenders may be used as, for example, blanc fixe, natural silica, etc.

Hydrolysis of the leached ore sulfate solution is carried out by mixing the leached ore sulfate solution with the calcium sulfate, preferably as an aqueous slurry of about 30% solids and in the ratio of about 2.0 to 2.4 $CaSO_4$ to $TiO_2$. The admixture is then heated and maintained at nearly the boiling point for about 4 hours until a major portion of the composite hydrate has been precipitated. The composite hydrate which is a titanium dioxide anatase modification is then filtered or otherwise separated from the mother liquor and washed with a suitable acid to remove excess alkali and sulfates.

Rutilization of the washed composite hydrate is effected directly, that is to say without the use of a rutile promoter, and is carried out under relatively conventional conditions, the calcination temperatures ranging from 900° C. to 975° C. and the time of calcination ranging from 3 to 9 hours, the temperatures of calcination being increased in increments of about 25° C. for periods of time of decreasing length during calcination.

A calcined composite titanium dioxide pigment material obtained by the process of this invention exhibits high tinting strength, clear white color, soft texture and 80% to 90% of the pigment in the form of rutile.

SULFATE SOLUTION FROM TITANIFEROUS ORE AND HYDROCHLORIC ACID LEACHED ORE RESIDUE

As pointed out above, the sulfate solution to which the extender is added to form a composite titanium dioxide hydrate may be formed from the digest of a hydrochloric leached ore residue alone, in the manner described above, or from the digest of a mixture of a titaniferous material, such as a titaniferous ore, or concentrate, or titaniferous slag, and a hydrochloric acid leached ore residue.

Specifically, the digest of a mixture of a titaniferous ore, such as, for example, the ore produced at the MacIntyre Mines at Tahawus, New York, commonly known as MacIntyre ore, and a leached ore residue is carried out by mixing ground MacIntyre ore with concentrated sulfuric acid and a hydrochloric acid leached ore residue in suitable proportions which experiments have shown are critical for the production of a leached ore sulfate solution which, upon admixture with an extender, may be hydrolyzed to form a coalesced precipitate having high convertibility to rutile upon calcination.

Typical of a MacIntyre ore which may be used in the digest is one which analyzes as comprising about 45% $TiO_2$ about 34% total iron and the remainder gangue, and which has been ground preferably to a particle size of from 0.5 to 20% plus 200 mesh.

The hydrochloric acid leached ore residue prepared in the manner already described is preferably added to the MacIntyre ore as a dehydrated, relatively coarse, sand-like material, the amount of acid leached residue being at least about 4% and preferably not less than about 5% on a $TiO_2$ basis. As hereinafter shown, within this range the percent rutilization of the calcined composite pigment will be from 80 to 100%.

It has been observed that, in general, the tinting strength values of a calcium base pigment formed from a leached residue sulfate solution prepared from these source materials increases with an increase in acid concentration at digestion, and especially high tinting strength values have been obtained with acid concentrations at digestion in the range of from 86 to 88%. It is preferred, therefore, to carry out the digestion of the admixed MacIntyre ore and acid leached ore residue at an acid concentration of substantially 88%, the ratio of sulfuric acid to ore and ore residue at digestion being from about 1.50 to 1.80, based on the total amount of admixed ore and acid leached ore residue, within which range a leached ore sulfate solution is formed from which coalesced precipitates are obtained having high conversions to rutile.

Specifically, the total amount of concentrated sulfuric acid required for digestion is placed in a digestion pot with the admixed titanium source materials, i. e. the MacIntyre ore and acid leached ore residue in ratios within the range described above, and the mixture heated to a temperature from 110° C. to 120° C., whereupon cold water is added to adjust the acid strength to a concentration of about 88% at reaction. Heating is continued until a digestion cake is formed and sets up, whereupon the cake is removed from the digestion pot and dissolved in water. The ferric iron values of the aqueous solution are reduced to the ferrous state by adding scrap iron or the like thereto and thereafter the solution is filtered and clarified to provide a leached ore sulfate solution having a titanium dioxide concentration of from 180 to 210 grams per liter.

To prepare a calcium base precipitate from the clarified leached ore sulfate solution, an extender, such as, for example, calcium sulfate anhydrite, is introduced into the leached ore sulfate solution, preferably in the form of an aqueous slurry of 30% solids prior to hydrolysis and in the ratio of about 2 parts $CaSO_4$ to 1 part $TiO_2$.

Hydrolysis of the composite leached ore sulfate solution is carried out by heating the admixture and maintaining it at the boiling point until a coalesced composite hydrate has been precipitated. The precipitate is then filtered or otherwise separated from the mother liquor and washed preferably with a suitable acid to remove the ferrous sulfate.

Rutilization, that is to say conversion of the composite titanium dioxide precipitate to rutile, is accomplished directly by calcination, that is to say without the use of a rutile promoter before calcination, and is carried out under substantially the same conditions used for calcining promoted hydrates, the calcination temperatures ranging from 900 to 975° C. and the time of calcination ranging from 3 to 4 hours, the temperature of calcination being increased periodically during calcination. A calcined pigment prepared in the above described manner will comprise from 80 to 100% $TiO_2$ in the form of rutile.

Although it has been postulated that the direct convertibility to rutile upon calcination of the calcium base hydrate of this invention may be due to the formation of extremely fine rutile crystallites during digestion which are carried through with the solution to the hydrolysate and act as rutile promoting seeds to convert the hydrate to rutile during calcination, extensive experimental work carried out in conjunction with the development of the present invention has established that this explanation is untenable and that, in fact, rutile convertibility of the calcium base hydrate is controlled by the small fraction of the hydrate which is precipitated during the initial stages of hydrolysis and that the physical and/or chemical characteristics of this hydrate fraction depend in turn upon the inherent nature of the sulfate solution formed by digestion of the mixture of ilmenite ore and acid leached ore residue.

SULFATE SOLUTIONS FROM TITANIFEROUS SLAG AND HYDROCHLORIC ACID LEACHED ORE RESIDUE

In addition to the use of a hydrochloric acid leached ore residue alone or a mixture of an ilmenite ore and a hydrochloric acid leached ore residue for forming sulfate solutions from which composite hydrates may be precipitated, the instant invention embodies the concept and method of forming a sulfate solution from a mixture of a titaniferous slag and a hydrochloric acid leached ore residue.

The titaniferous slag used may be obtained by smelting titaniferous iron ores in the presence of a carbonaceous reducing agent to produce a slag which has a low iron fraction but which is rich in titanium values. A typical slag is one formed from ilmenite ore and analyzing as high as 67% $TiO_2$ and 5% total iron. As in the use of an ore, the slag is ground preferably to a particle size in the range of from 0.5 to 2.0% plus 200 mesh.

The titanium sulfate solution is prepared from a mixture of the ground slag and the hydrochloric acid leached ore residue. For optimum results the ratio of slag to acid leached ore should be about 4 to 1 on a $TiO_2$ basis, but it will be understood that some variation in this preferred ratio may be made with satisfactory results.

To the admixed slag and acid leached ore residue is added concentrated sulfuric acid in a ratio within the range of from about 1.6 to 1.7 parts acid to 1 part of the ore-slag admixture, and the mixture heated to about 120° C. within a period of from 10 to 45 minutes, whereupon the acid concentration is adjusted for reaction to about 88%, the reaction being continued until a digestion cake sets up. The digestion cake is then cut with water and the solution filtered to form a clarified leached ore sulfate solution having a titanium dioxide concentration of from 180 to 210 grams per liter.

As described above, the hydrolysis of the leached ore sulfate solution formed from the digest of a slag and an acid leached ore residue is accomplished by introducing into the sulfate solution or otherwise admixing therewith, preferably prior to hydrolysis, an extender, such as a slurry of calcium sulfate anhydrite of about 30% solids and in the ratio of about 2 parts $CaSO_4$ to 1 part $TiO_2$; and then heating the mixture and maintaining it at nearly the boiling point for about 4 hours until a large portion of the composite hydrate is precipitated. The composite hydrate, which is a titanium dioxide anatase modification, is then filtered or otherwise separated from the mother liquor and washed with a suitable acid to remove excess alkali and sulfates.

Rutilization of the washed composite hydrate is effected directly, that is to say without the use of a rutile promoter before calcination, and is carried out under relatively convention conditions used for calcining promoted hydrates, the calcination temperature ranging from 900° to 975° C. and the time of calcination ranging from 3 to 4 hours, the temperatures of calcination being increased periodically during calcination.

A calcined composite titanium dioxide pigment obtained from the digest of an admixture of a titaniferous slag and a hydrochloric acid leached ore residue exhibits high tinting strength, clear white color, soft texture and substantially 80% to 90% of the pigment in the form of rutile.

ADMIXED SULFATE SOLUTIONS

A still further modification of the procedures described above for forming composite pigments by the use of hydrochloric acid leached ore residues is that of admixing a sulfate solution prepared from a hydrochloric acid leached ore residue, as in the manner described above, with a sulfate solution prepared from a titaniferous ore or from a titaniferous slag. It has been found that when sulfate solutions formed from these materials are admixed to provide a leached ore sulfate solution in which from 5% to 10% of the titanium dioxide, on a weight basis, is derived from the hydrochloric acid leached ore residue, the leached ore sulfate solution, when hydrolyzed in the presence of an anhydrite, will produce a composite titanium dioxide hydrate of the anatase modification which will readily convert to the rutile structure upon calcination without the use of a rutile promoter.

By way of illustrating the invention more fully, the following examples are given describing the preparation of a composite titanium dioxide pigment material by the use of a hydrochloric acid leached ore residue.

Example I

To 1000 parts MacIntyre ore prepared in the manner hereinabove described and having a particle size of 0.9% plus 200 mesh was added 1700 parts 96% sulfuric acid, the ratio of acid, calculated as 100% sulfuric acid, to ore being 1.77. The mixture was heated initially to a temperature in the range of from 110° C. to 120° C., whereupon cold water was added to adjust the acid concentration at reaction to 88%. Heating was continued for about ½ hour at the end of which time the digestion cake had formed and set up.

The digestion cake was then cut with water and the solution filtered to form a clarified solution which analyzed as follows:

| | |
|---|---|
| Specific gravity | 1.525 |
| Reduced $TiO_2$ grams/liter | 6.4 |
| Total $TiO_2$ do | 128.0 |
| $H_2SO_4$ do | 331.0 |
| $FeSO_4$ do | 253.0 |

The clarified sulfate solution was then admixed with a calcium sulfate slurry containing about 30% solids in the ratio of about 2.3 $CaSO_4$ to $TiO_2$, the acidity of the solution being adjusted to about 16.6% by the addition of sulfuric acid.

The solution which analyzed about 74.8 grams/liter $TiO_2$ was boiled for three and one-half hours, whereupon about 94.2% of the titanium was precipitated out as a composite precipitate. The latter was separated from the liquid, washed, dried and then calcined for one hour at 925° C. and one hour at 950° C. Substantially none of the titanium oxide component was converted to rutile.

By way of comparison, 1000 parts hydrochloric acid leached ore residue prepared in the manner hereinabove described and having a particle size of 0.9% plus 200 mesh was added to 1700 parts 96% sulfuric acid, the ratio of acid, calculated at 100% sulfuric acid, to ore being 1.77. The mixture was heated in the same manner as that used for the ore until a digestion cake had set up. The latter was then dissolved in water to produce a clarified solution which analyzed as follows:

| | |
|---|---|
| Specific gravity | 1.265 |
| Reduced $TiO_2$ grams/liter | 3.1 |
| Total $TiO_2$ do | 103.0 |
| $H_2SO_4$ do | 282.0 |
| $FeSO_4$ do | 23.0 |

The clarified sulfate solution, sometimes referred to as a leached ore sulfate solution, was then admixed with a calcium sulfate slurry containing about 30% solids in the ratio of about 2.3 $CaSO_4$ to $TiO_2$, the acidity of the solution being adjusted to about 18% by the addition of sulfuric acid. The solution which analyzed about 66.8 grams/liter $TiO_2$ was boiled for three and one-half hours, whereupon about 95.3% of the titanium was precipitated out as a composite precipitate. The latter was separated from the liquid, washed, dried and then calcined for one hour at 925° C. and one hour at 950° C. Approximately 100% of the titanium oxide component of the calcined pigment was found to be present in the form of rutile.

*Example II*

From the foregoing example it is manifest that upon calcining a calcium base pigment prepared from MacIntyre ore alone, i. e. without the use of a rutile promoter, substantially none of the $TiO_2$ component is converted to rutile while calcination of a calcium base pigment prepared from hydrochloric acid leached ore residue alone effects substantially 100% conversion of the $TiO_2$ component to rutile.

To illustrate further the characteristic effect of the hydrochloric acid leached residue in effecting the conversion of the $TiO_2$ component of a calcium base pigment to the rutile structure, sulfate solutions prepared from digests of a MacIntyre ore and a hydrochloric acid leached ore residue respectively and having the analysis given in Example I, were mixed together and the admixture hydrolyzed as set forth below.

One mixture of the above-identified sulfate solutions was prepared in the ratio of 95% MacIntyre ore solution to 5% leached ore solution on a $TiO_2$ basis. The admixture had the following analysis:

Specific gravity_____ 1.507
Reduced $TiO_2$_____grams/liter__ 6.2
Total $TiO_2$_____do____ 126.3
$H_2SO_4$ _____do____ 327.5
$FeSO_4$ _____do____ 239.0

To this solution was added a calcium sulfate slurry containing 30% solids and in the ratio of 2.3 $CaSO_4$ to $TiO_2$. The solution was then boiled for three and one-half hours whereupon about 93.9% of the $TiO_2$ was precipitated out as a composite hydrolysate.

The latter was washed, dried and calcined for one hour at 925° C. and for one hour at 950° C., at the end of which time substantially 40% of the $TiO_2$ component was converted to the rutile structure, the tinting strength of the calcined composite pigment being about 534, as determined by the Reynolds Method described in Chapter II, page 37 of Gardner's Physical and Chemical Examination of Paints, Varnishes, Lacquers and Colors, 9th edition, 1939.

A second mixture of the MacIntyre ore and leached ore residue sulfate solution was made but in this instance in the ratio of 90% MacIntyre ore solution to 10% leached ore residue solution on a $TiO_2$ basis. When processed in the manner described above, substantially 60% of the $TiO_2$ component was converted to the rutile structure, the tinting strength of the composite calcined pigment being about 560.

From the foregoing examples it is clear that for admixtures of the sulfate solutions prepared from a titaniferous ore and a hydrochloric acid leached residue respectively, at least about 4% of the latter component on a $TiO_2$ basis is required and preferably from about 5% to 10% and above for effecting appreciable conversions of the $TiO_2$ component to the rutile structure.

*Example III*

To further illustrate the invention, a titaniferous ore and hydrochloric acid leached ore residue were mixed together prior to digestion to form a leached ore sulfate solution for the production of a composite pigment convertible to the rutile modification by calcination alone.

To 2125 parts of MacIntyre ore of the analysis described above and ground to a particle size of from 0.5 to 2.0% plus 200 mesh was added 71.2 parts hydrochloric acid leached ore residue of 0.9% plus 200 mesh, the ratio of MacIntyre ore to leached ore residue, on a $TiO_2$ basis, being about 18.2. To the mixture was added 4050 parts 96% sulfuric acid, the ratio of acid, calculated as 100% $H_2SO_4$, to the total ores, on a weight basis, being 1.77. The mixture was heated initially to a temperature of from 110–120° C. and thereafter cold water was added to adjust the acid concentration at hydrolysis to about 88%. Heating was continued for about ½ hour at the end of which time the digestion cake had formed and set up.

The digestion cake was then dissolved in water and the ferric iron values reduced to ferrous iron by the addition of scrap iron or the like. The solution was then filtered and clarified to produce a leached ore sulfate solution which analyzed as follows:

Specific gravity_____ 1.507
Reduced $TiO_2$_____grams/liter__ 2.6
Total $TiO_2$_____do____ 126.0
$H_2SO_4$ _____do____ 336
$FeSO_4$ _____do____ 225.0

The clarified leached ore sulfate solution was then admixed with a calcium sulfate slurry containing about 30% solids in the ratio of 2.3 parts $CaSO_4$ to $TiO_2$. The acidity of the solution was adjusted to about 17% at hydrolysis by the addition of sulfuric acid. The admixture had the following analysis:

$TiO_2$ _____grams/liter__ 75.8
$H_2SO_4$ _____percent__ 17.0

The solution was boiled for four hours, whereupon about 94.7% of the $TiO_2$ was precipitated out as a composite hydrolysate. The latter was separated from the liquor, washed, and then calcined for one hour at about 925° C. and for one hour at about 950° C. The calcined calcium base pigment analyzed as comprising substantially 100% rutile. The tinting strength of the pigment was about 597.

A second digest was made from a mixture of the MacIntyre ore and the hydrochloric acid leached ore residue in which the ratio of ore to leached ore residue on a $TiO_2$ basis was about 8.9. The treatment of the admixture to form a digest cake from which a leached ore sulfate solution and ultimately a composite hydrolysate was produced was substantially as described above. In this case substantially 80% of the calcined pigment was converted to rutile, the tinting strength of which was as high as about 613.

A third digest prepared from a mixture of MacIntyre ore and hydrochloric acid leached residue in the ratio of about 3.95 parts ore to leached residue on a $TiO_2$ basis yielded a composite hydrolysate which upon calcination was converted to substantially 100% rutile, the tinting strength of which was about 608.

*Example IV*

As an example of the use of a mixture of a titaniferous slag and hydrochloric acid leached ore residue prior to digestion to produce a composite pigment convertible to the rutile modification by calcination alone, i. e. without the use of a rutile promoter, a slag analyzed as comprising about 66.8% $TiO_2$ and 5% iron and having a particle size of 0.5% plus 200 mesh was mixed with a hydrochloric acid leached ore residue of the specifications described above in the ratio of 4.2 parts slag to leached ore residue on a $TiO_2$ basis. To the admixture was added 96% sulfuric acid, the ratio of acid, calculated as 100% $H_2SO_4$, to the total ore mixture being 1.695. The mixture was heated initially to from about 110 to 120° C., whereupon cold water was added to adjust the acid concentration at reaction to about 88%. Heating was continued for about ½ hour at the end of which time the digestion cake had formed and set up.

The digestion cake was then dissolved in water and the ferric iron values reduced to ferrous iron by the addition of scrap iron or the like. The solution was then filtered and clarified to produce a leached ore sulfate solution which analyzed as follows:

| | |
|---|---|
| Specific gravity | 1.51 |
| Reduced $TiO_2$ grams/liter | 2.6 |
| Total $TiO_2$ do | 216.0 |
| $H_2SO_4$ do | 450.0 |
| $FeSO_4$ do | 44.2 |

The clarified leached ore sulfate solution was then admixed with a calcium sulfate slurry containing about 31.5% solids in the ratio of 2.36 parts $CaSO_4$ to $TiO_2$. The acidity of the solution was adjusted to about 18% at hydrolysis by the addition of sulfuric acid. The admixture had the following analysis:

| | Grams/liter |
|---|---|
| $TiO_2$ | 92.2 |
| $H_2SO_4$ | 219.0 |
| $FeSO_4$ | 18.9 |
| $CaSO_4$ | 216.5 |

The solution was boiled for about four hours, whereupon about 96.5% of the $TiO_2$ was precipitated out as a composite hydrolysate. The latter was separated from the liquor, washed and then calcined for two hours at 950° C., at the end of which time 90% of the calcium base pigment was converted to rutile, the tinting strength of the component pigment being about 610.

*Example V*

The effect of a hydrochloric acid leached ore residue in converting composite hydrolysates directly to rutile calcined pigments is also illustrated by the instant example wherein a sulfate solution is prepared from a mixture of the sulfate solutions formed from the digests of a titaniferous slag and a hydrochloric acid leached ore residue respectively.

The slag solution was formed by digesting a slag in concentrated (96%) sulfuric acid in the ratio of 1.65 parts acid, calculated as 100% sulfuric acid, to slag, the percent acid concentration at reaction being adjusted to 88%. The digestion cake was dissolved in water and the ferric iron values reduced to ferrous iron by the addition of scrap iron. The solution was filtered and clarified to produce sulfate solutions which analyzed as follows:

| | |
|---|---|
| Specific gravity | 1.475 |
| Reduced $TiO_2$ grams/liter | 3.6 |
| Total $TiO_2$ do | 194.0 |
| $H_2SO_4$ do | 397.0 |
| $FeSO_4$ do | 42.6 |

A sulfate solution was also formed from a hydrochloric acid leached ore residue by digesting the leached ore residue in the manner hereinabove described to produce a leached ore sulfate solution of the following analysis:

| | |
|---|---|
| Specific gravity | 1.427 |
| Reduced $TiO_2$ grams/liter | 2.6 |
| Total $TiO_2$ do | 183.0 |
| $H_2SO_4$ do | 433.0 |
| $FeSO_4$ do | 40.5 |

The two solutions were then mixed in the ratio of 4 parts slag solution to 1 part leached ore solution, the admixture having the following analysis:

| | |
|---|---|
| Specific gravity | 1.463 |
| Reduced $TiO_2$ grams/liter | 3.4 |
| Total $TiO_2$ do | 191.8 |
| $H_2SO_4$ do | 404.0 |
| $FeSO_4$ do | 42.2 |

To the admixed sulfate solutions was added a calcium sulfate slurry of about 30.2% solids in the ratio of 2.36 $CaSO_4$ to $TiO_2$. The acidity of the solution was adjusted to about 18% at hydrolysis by the addition of sulfuric acid and had the following analysis:

| | Grams/liter |
|---|---|
| $TiO_2$ | 86.2 |
| $H_2SO_4$ | 224.0 |
| $FeSO_4$ | 18.8 |
| $CaSO_4$ | 202.5 |

The solution was boiled for 4 hours whereupon about 96.8% of the $TiO_2$ was precipitated as a composite hydrolysate. The latter was separated from the liquor, washed and then calcined for two hours at 950° C. and for two hours at 975° C., at the end of which time substantially 95% of the composite pigment was converted to rutile, the tinting strength of the composite pigment being from 610 to 620.

*Example VI*

By way of comparison, a sulfate solution was prepared from a slag solution alone having the analysis given in Example V above. To this solution was added a calcium sulfate slurry of about 30.2% solids in the ratio of 2.36 $CaSO_4$ to $TiO_2$. After adjusting the acidity of the solution, it analyzed as follows:

| | Grams/liter |
|---|---|
| $TiO_2$ | 90.3 |
| $H_2SO_4$ | 217.0 |
| $FeSO_4$ | 19.7 |
| $CaSO_4$ | 212 |

The solution was boiled for four hours whereupon 94.8% of the $TiO_2$ was recovered as a composite hydrolysate which upon washing, drying and calcining for two hours at 950° C. and two hours at 975° C. evidenced substantially no conversion of the $TiO_2$ component to the rutile structure.

From the foregoing description of the invention, it will be manifest that the use of a hydrochloric acid leached ore residue either alone or in conjunction with other titaniferous materials such as titaniferous ores and slags; and sulfate solutions formed therefrom will serve, quite unexpectedly, to convert the $TiO_2$ component in a composite hydrolysate formed thereby to rutile by calcination alone, i. e. without the benefit or necessity of a rutile promoter prior to calcination, the conversion of the $TiO_2$ component to rutile being from 85% to 100% and the pigment being characterized by high tinting strength, soft texture and fine particle size.

While this invention has been described and illustrated by the examples shown, it is not intended to be strictly limited thereto, and other variations and modifications may be employed within the scope of the following claims.

We claim:

1. A process for the manufacture of a composite pigment material comprising titanium dioxide in rutile form and an extender which includes: heating a mixture of titaniferous ore and hydrochloric acid in the ratio of about 1:2.25 to precipitate a substantially iron-free hydrochloric acid leached ore residue digesting said hydrochloric acid leached ore residue in the presence of concentrated sulfuric acid the ratio of acid to leached ore residue being in the range of from 1.5 to 1.8 to form a digestion cake; solubilizing said digestion cake in water to form an aqueous leached ore sulfate solution; mixing calcium sulfate with said leached ore sulfate solutions; hydrolyzing said admixture to precipitate out a hydrate of TiO₂ and calcium sulfate and then calcining said hydrate TiO₂ and calcium sulfate at a temperature within the range of from 925–975° C.

2. A process for the manufacture of a composite pigment material comprising titanium dioxide in rutile form and an extender which includes: heating a mixture of titaniferous ore and hydrochloric acid in the ratio of about 1:2.25 to precipitate a substantially iron-free hydrochloric acid leached ore residue digesting a mixture of titaniferous ore and said acid leached ore residue in the presence of concentrated sulfuric acid to form a digestion cake, said acid leached ore residue being present in said admixture in an amount within the range of from 4% to 20% on a titanium dioxide basis and the ratio of sulfuric acid to the admixed ore and acid leached ore residue being in the range of from 1.6 to 1.8; solubilizing said digestion cake in water to form an aqueous leached ore sulfate solution; mixing an extender selected from the group consisting of the sulfates of barium, calcium and strontium with said leached ore sulfate solution; hydrolyzing said admixture to precipitate out a hydrate of TiO₂ and an alkaline earth sulfate, and then calcining said hydrate at a temperature within the range of from 925–975° C.

3. A process for the manufacture of a composite pigment material comprising titanium dioxide in rutile form and a calcium sulfate extender which includes: heating a mixture of titaniferous ore and hydrochloric acid in the ratio of about 1:2.25 to precipitate a substantially iron-free hydrochloric acid leached ore residue mixing a titaniferous ore with said hydrochloric acid leached ore residue with the acid leached ore residue being present in said mixture in an amount within the range of 5% to 10% on a titanium dioxide basis; digesting the admixed ore and acid leached ore residue in the presence of concentrated sulfuric acid to form a digestion cake, the ratio of sulfuric acid to the admixed ore and acid leached ore residue being about 1.7; solubilizing said digestion cake to form a leached ore sulfate solution; mixing a calcium sulfate slurry of about 30% solids content with said leached ore sulfate solution; hydrolyzing said admixture to precipitate out a hydrate of TiO₂ and an alkaline earth sulfate and then calcining said hydrate at a temperature within the range of from 925–975° C.

4. A process for the manufacture of a composite pigment material comprising titanium dioxide in rutile form and an extender which includes: heating a mixture of titaniferous ore and hydrochloric acid in the ratio of about 1:2.25 to precipitate a substantially iron-free hydrochloric acid leached ore residue mixing a titaniferous slag with said acid leached ore residue with the acid leached ore residue being present in the admixture in an amount of about 20% on a titanium dioxide basis; digesting the admixed slag and acid leached ore residue in concentrated sulfuric acid to form a digestion cake, the ratio of sulfuric acid to the admixed slag and leached ore residue being in the range of 1.6 to 1.8; solubilizing said cake to form a leached ore sulfate solution; mixing an extender selected from the group consisting of the sulfates of barium, calcium and strontium with said leached ore sulfate solution; hydrolyzing said admixture to precipitate out a hydrate of TiO₂ and an alkaline earth sulfate and then calcining said hydrate at a temperature within the range of from 925–975° C.

5. A process for the manufacture of a composite pigment material comprising titanium dioxide in rutile form and calcium sulfate anhydrite which includes: heating a mixture of titaniferous ore and hydrochloric acid in the ratio of about 1:2.25 to precipitate a substantially iron-free hydrochloric acid leached ore residue mixing a titaniferous slag with said acid leached ore residue with the acid leached ore residue being present in the admixture in an amount of about 20% on a titanium dioxide basis; digesting the admixed slag and acid leached ore residue in concentrated sulfuric acid to form a digestion cake, the ratio of sulfuric acid to the admixed slag and leached ore residue being in the range of 1.6 to 1.8; solubilizing said cake to form a leached ore sulfate solution; mixing a calcium sulfate slurry of 30% solids content with said leached ore sulfate solution; hydrolyzing said admixture to precipitate out a hydrate of TiO₂ and an alkaline earth sulfate and then calcining said hydrate at a temperature within the range of from 925–975° C.

6. A process for the manufacture of a composite pigment material comprising titanium dioxide in rutile form and an extender which includes: heating a mixture of titaniferous ore and hydrochloric acid in the ratio of about 1:2.25 to precipitate a substantially iron-free hydrochloric acid leached ore residue digesting a titaniferous material in sulfuric acid to form a sulfate solution the ratio of acid to said titaniferous material being about 1.65; digesting said hydrochloric acid leached ore residue in concentrated sulfuric acid the ratio of acid to leached ore residue being in the range of from 1.5 to 1.8 to form a second sulfate solution; admixing the sulfate solutions formed from the titaniferous material and the hydrochloric acid leached ore residue respectively with the latter solution being present in the admixture in an amount within the range of from 4% to 20% on a TiO₂ basis; mixing an extender selected from the group consisting of the sulfates of barium, calcium and strontium with said admixed sulfate solutions; hydrolyzing said admixture to precipitate out a hydrate of TiO₂ and an alkaline earth sulfate and then calcining said hydrate at a temperature within the range of from 925–975° C.

7. A process for the manufacture of a composite pigment material comprising titanium dioxide in rutile form and an extender which includes: heating a mixture of titaniferous ore and hydrochloric acid in the ratio of about 1:2.25 to precipitate a substantially iron-free hydrochloric acid leached ore residue digesting a titaniferous slag in sulfuric acid to form a sulfate solution, the ratio of said acid to said slag being about 1.65; digesting said hydrochloric acid leached ore residue in concentrated sulfuric acid, the ratio of said acid to leached ore residue being in the range of from 1.5 to 1.8 to form a second sulfate solution; admixing the sulfate solutions formed from the titaniferous slag and the hydrochloric acid leached ore residue respectively, the latter being present in an amount from 5% to 10% on a TiO₂ basis; mixing an extender selected from the group consisting of the sulfates of barium, calcium and strontium with said admixed sulfate solutions; hydrolyzing said admixture to precipitate out a hydrate of TiO₂ and an alkaline earth sulfate and then calcining said hydrate at a temperature within the range of from 925–975° C.

8. A process for the manufacture of a composite pigment material comprising titanium dioxide in rutile form and calcium sulfate anhydrite which includes: heating a mixture of titaniferous ore and hydrochloric acid in the ratio of about 1:2.25 to precipitate a substantially iron-free hydrochloric acid leached ore residue digesting a titaniferous material in the sulfuric acid to form a sulfate solution, the ratio of acid to the titaniferous material being about 1.65; digesting said hydrochloric acid leached ore residue in concentrated sulfuric acid to form a second sulfate solution, the ratio of sulfuric acid to hydrochloric acid leached ore residue being about 1.60; mixing the sulfate solution formed from the titaniferous material with the sulfate solution formed from the acid leached ore residue with the latter solution being present in the admixture in an amount to within the range of from 5% to 10% on a $TiO_2$ basis; mixing a calcium sulfate slurry of about 30% solids content with said admixed sulfate solutions; hydrolyzing said admixture to precipitate out a hydrate of $TiO_2$ and an alkaline earth sulfate and then calcining said hydrate at a temperature within the range of from 925–975° C.

References Cited in the file of this patent

UNITED STATES PATENTS

| | | |
|---|---|---|
| 2,088,913 | Llewellyn | Aug. 3, 1937 |
| 2,167,627 | Alessondroni | Aug. 1, 1939 |

FOREIGN PATENTS

| | | |
|---|---|---|
| 274,072 | Great Britain | Mar. 8, 1928 |